Figure 1:
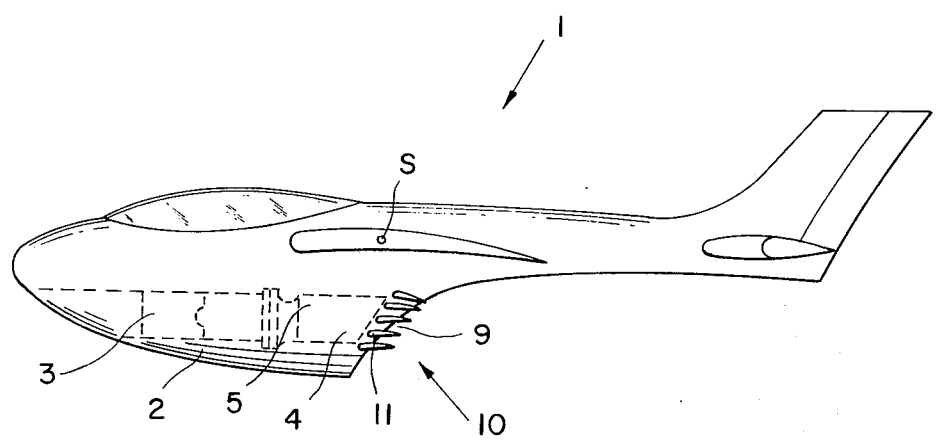

United States Patent [19]

Machuta

[11] 3,954,230

[45] May 4, 1976

[54] FLOW ELEMENTS FOR INFLUENCING FLOWING MEDIA

[75] Inventor: Friedrich Machuta, Uhldingen, Germany

[73] Assignee: Dornier System GmbH, Germany

[22] Filed: July 1, 1974

[21] Appl. No.: 484,690

[30] Foreign Application Priority Data

Sept. 26, 1973 Germany............................ 2348304

[52] U.S. Cl................................ 244/44; 244/12 D; 416/23
[51] Int. Cl.²........................................... B64C 3/48
[58] Field of Search................. 244/12 D, 23 D, 44; 239/265.19, 265.25, 265.27, 265.43, 546, 519; 416/23, 240

[56] References Cited
UNITED STATES PATENTS

| | | | |
|---|---|---|---|
| 1,365,346 | 1/1921 | Schenkel................................ | 244/44 |
| 2,370,844 | 3/1945 | Davis...................................... | 244/82 |
| 2,520,268 | 8/1950 | Avery.............................. | 416/240 X |
| 3,100,377 | 8/1963 | Kosin et al..................... | 244/12 D X |
| 3,109,613 | 11/1963 | Bryant et al.......................... | 244/44 |
| 3,118,639 | 1/1964 | Kiceniuk............................... | 244/44 |
| 3,179,357 | 4/1965 | Lyon...................................... | 244/44 |
| 3,258,206 | 6/1966 | Simonson..................... | 244/12 D X |
| 3,704,828 | 12/1972 | Studer et al. ................. | 239/265.19 |

FOREIGN PATENTS OR APPLICATIONS 631,287 12/1927 France.................................. 244/44

*Primary Examiner*—Trygve M. Blix
*Assistant Examiner*—Barry L. Kelmachter
*Attorney, Agent, or Firm*—James E. Bryan

[57] ABSTRACT

A flow element for influencing flowing media including a bending-elastic exterior covering, a variable skeleton carrier in the covering, and a support between the exterior covering and the skeleton carrier, whereby movement of the latter is transmitted to the covering in the sense of a profile change.

12 Claims, 10 Drawing Figures

FLOW ELEMENTS FOR INFLUENCING FLOWING MEDIA

The present invention relates to flow elements having a bending-elastic covering for influencing flowing media, such as jet deflector blades or vanes for example, for deflector vane grids, or wings, rudders, or the like.

For example in the deflection of the propellent gas jets of jet engines in airplanes for the purpose of producing vertical thrust, the thrust losses are desirably maintained as low as possible. Particularly in jet deflector vanes mounted in a cascade-like fashion, i.e. so-called vane grids of cascades, the profiling of the deflector vanes or of the passage cross-section of the jet-guiding channels formed between the deflector vanes is of importance. In any possible deflecting position of the jet deflector vanes there will arise varying optimal profile shapes for a jet deflection that is as low in losses as possible. In the adaptation of the profile shape, both the curvature of the vanes and, at the same time, also the profile thickness in the individual cross-sections must be modified. Generally speaking, however, such a profile adaptation is opposed by structural and other considerations so that the required optimal profile shape could not heretofore be realized in many cases.

The same problems arise also in wings, rudders, or the like for aircraft. For example, in wings, a different profile shape is optimal for take-off and landing than for high-speed flight. A transition from one profile shape to the other is, however, opposed here again by the structural difficulties already referred to.

It is the object of the present invention to provide deflector vanes and wings, rudders, or the like which are structurally so developed that an optimal adaptation of the profile thickness in the individual cross-sections, or simultaneously a modification of the profile curvature, is rendered possible thereby.

This object is obtained, in accordance with the present invention, by virtue of the fact that one or more skeleton carriers, being variable in the form or in the position thereof, are positioned within the covering, and the movement of the skeleton carriers is transmitted onto the covering in the sense of a profile change, i.e. a change of the thickness distribution or a change of the profile curvature of the flow element. By virtue of this construction, the thickness distribution in the direction of the profile depth of the flow element and, if required, simultaneously the profile curvature are forcibly adapted to the respectively prevailing operating conditions.

According to a further development of the present invention, one additional feature thereof is that positioned between the skeleton carrier and the bending-elastic covering are supporting elements which forcibly act upon the covering in correspondence with the displacing movement of the skeleton carrier. By means of these supporting elements, the position or shape modification of the skeleton carrier is transmitted to the covering in a simple manner. The supporting elements allow, by a corresponding construction, for example also for a different displacement of individual sections of the covering by means of the relative displacing movement of the skeleton carrier.

An additional feature of the present invention is that the skeleton carrier is displaceable with respect to the covering in the direction of the profile depth of the flow element. As a result, the covering may be influenced in an extremely simple manner by way of the supporting elements in the sense of a modification of the thickness distribution, as well as in the sense of a modification or change of the curvature of the flow element or body.

In an advantageous embodiment according to the present invention the skeleton carrier is constructed so as to be bending-elastic and displaceable in the sense of a curvature change of the flow element or body.

Furthermore, in another advantageous embodiment of the present invention, the skeleton carrier and the upper and lower coverings are rigidly clamped in within the area of the nose portion and are displaceable relative to each other outside of the clamping point in the direction of the profile depth of the flow element or body. In case of a deflection of the skeleton carrier, there thus will be produce a relative movement between the upper and the lower covering and the skeleton carrier in the direction of the profile depth. From this relative movement in conjunction with the construction of the supporting elements, there results a combined displacement of the covering in the sense of a change of the thickness distribution with a forcible change of the profile curvature.

Moreover, it is proposed as a further embodiment of the present invention that one or more torsion rods be provided, one end of which is rigidly connected with the nose portion of the flow element or body, and the other end of which is held immovably. Due to the selected spring characteristic of the torsion rod, predetermined curvature shapes of the flow element or body can be adjusted during a bending displacement of the skeleton carrier. Furthermore, the leading profile edge may be brought into a specific angle of incidence position with respect to the oncoming air flow.

Figure 1A:
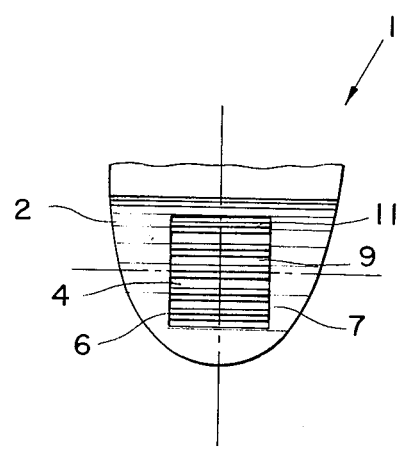
Figure 2:
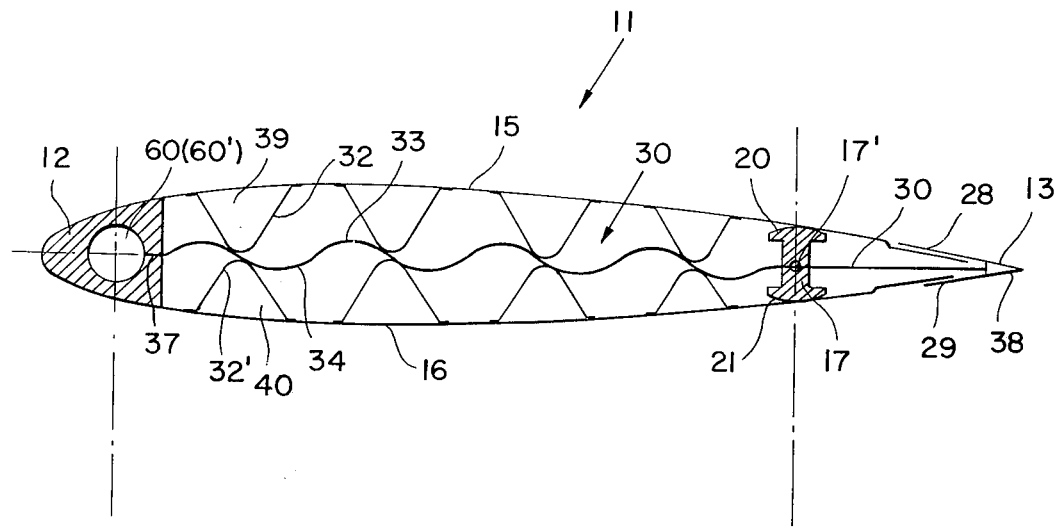
Figure 3:
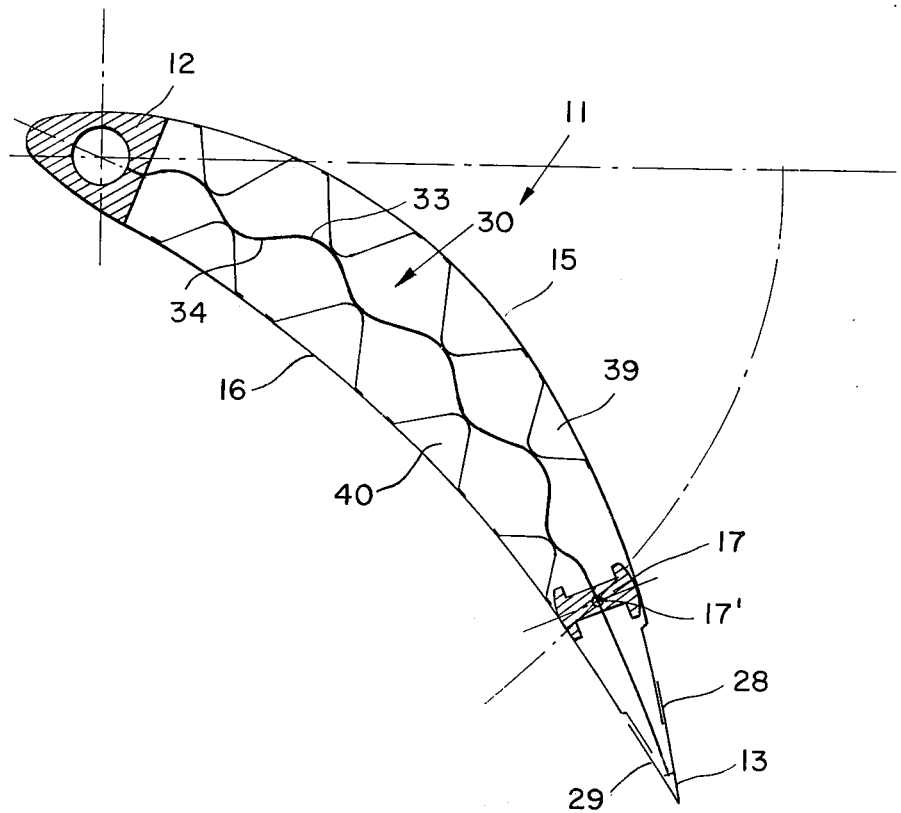
Figure 4:
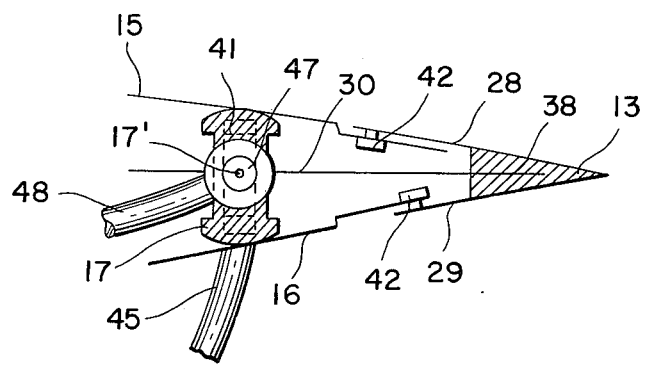
Figure 5:
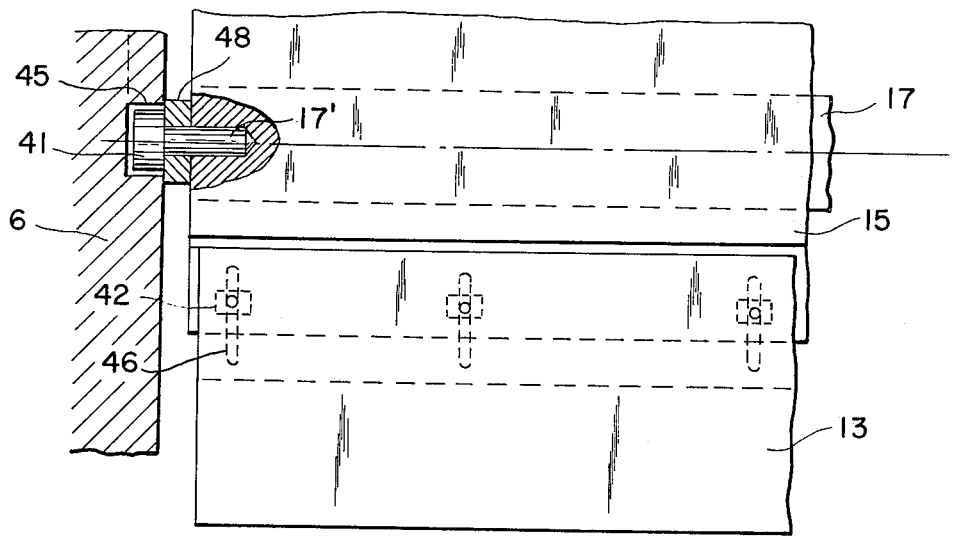
Figure 6:
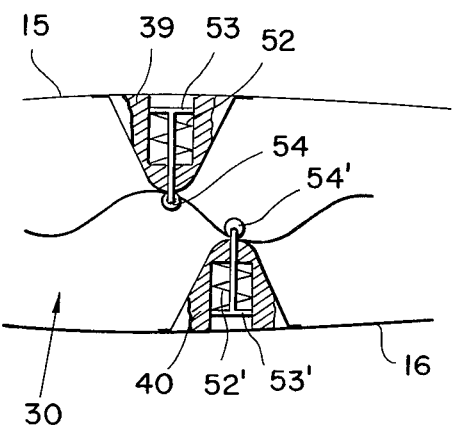
Figure 7:
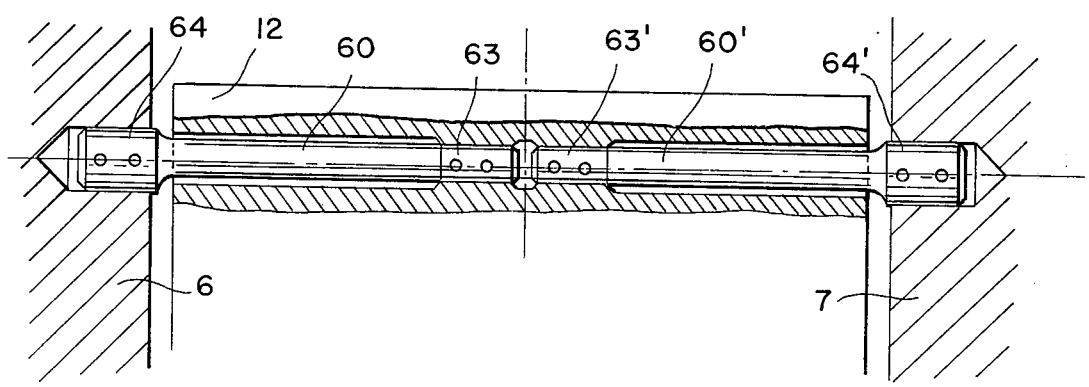
Figure 8:
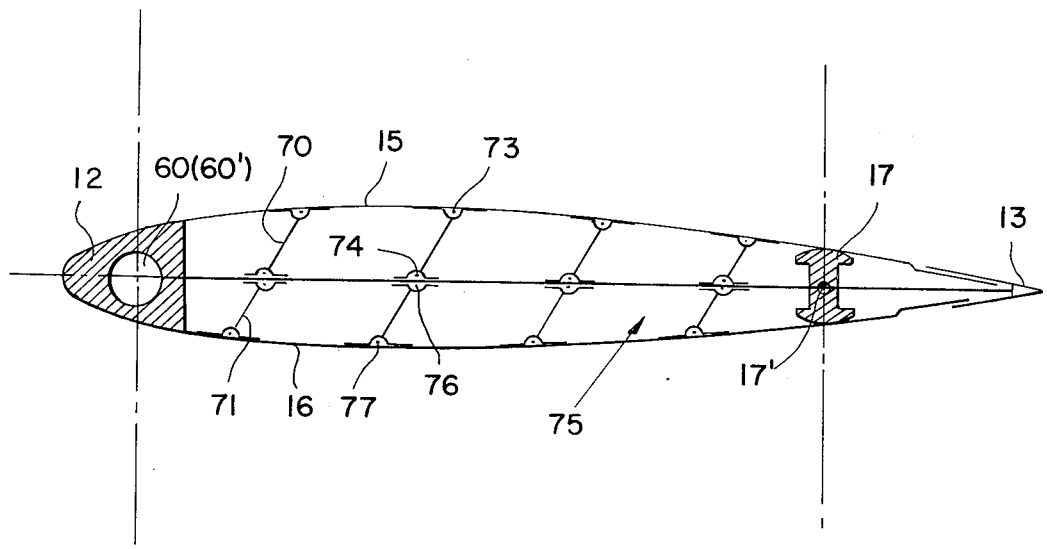
Figure 9:
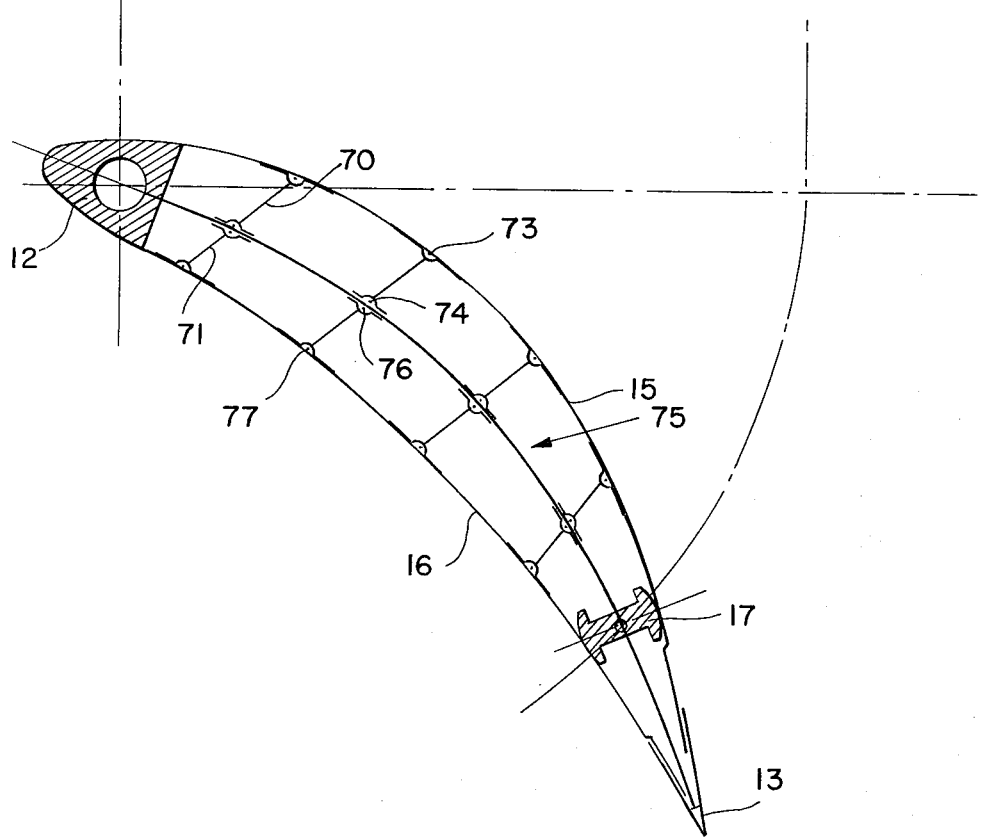

Two embodiments according to the present invention are illustrated in the accompanying drawings, wherein FIG. 1 is a side view of an aircraft with a jet engine and a blade or vane cascade for deflecting the emerging propellent gas jet, FIG. 1a illustrates, in a rear view of the aircraft, the exhaust opening of the jet nozzle in conjunction with the cascade, FIG. 2 illustrates one embodiment for the construction of the jet-deflecting blades of the cascade, wherein the jet-deflecting blades are represented in a position for the exhaust of the propellent gas jet without deflection, FIG. 3 illustrates one of the jet-deflecting blades of the cascade in a position deflecting the propellent gas jet from its direction of exhaust from the jet nozzle, FIG. 4 shows in a segment from FIG. 2, represented at an enlarged scale, details of the construction of the trailing edge of the deflecting blades and a displacing device, FIG. 5 is a top plan view of a segment of the trailing edge of the deflecting blades according to FIG. 2, FIG. 6 illustrates a segment from FIG. 2, at an enlarged scale, and shows a pressing device within the jet-deflecting blades, FIG. 7 is a top plan view of one of the jet deflector blades and illustrates details of the bearing, FIG. 8 illustrates another embodiment for the construction of the jet-deflecting blades of the cascade in a position for the exhaust of the propellent gas jet without deflection and FIG. 9 illustrates one of the jet-deflecting blades in a position deflecting the propellent gas jet from its exhaust direction.

In FIG. 1, the aircraft is identified with reference numeral 1; its lower fuselage part 2 serves for receiving a jet engine 3 with the jet exhaust nozzle 4. Between the jet engine 3 and the jet exhaust nozzle 4 is the jet-guiding pipe 5 by means of which two lateral walls 6 and 7 are formed (FIG. 1a). In the embodiment shown, the jet exhaust nozzle 4 is positioned below the center of gravity S of the airplane. Coordinated to the jet exhaust nozzle 4 is the jet-deflecting device 10 which is composed of a cascade-like blade or vane cascade or grid with the jet-deflecting blades 11, and which serves either for allowing the propellent gas jet discharged from the jet nozzle 4 to emerge rearwardly without deflection, or for deflecting it from the exhaust direction thereof into different directions for the purpose of producing vertical thrust. Between the blades 11 of the cascade are the jet-guiding channels 9.

As is apparent from FIGS. 2 and 3, the individual jet-deflecting blades 11 are profiled in a streamlined manner and are symmetrical. Each of the blades comprises a rigid nose portion 12 and an equally rigid trailing edge part 13 which ends in a knife-edge fashion. Further present is a covering 15 and 16 forming the upper side and underside of the blade profile; this covering being bending-elastic. The upper and the lower covering 15 and 16 is rigidly connected with the rigid nose portion 12. Inserted within the covering 15 and 16 in the rear area of the jet-deflecting blades 11 is a guide spar 17, at whose curved bearing surfaces 20 and 21 of the upper and lower flanges the coverings 15 and 16 are held in contact. The bearing areas 20 and 21 at the guide spar 17 are curved in the direction of the profile depth. The guide spar 17 is pivotal about an axle center 17'. The upper and lower coverings 15 and 16 do not extend to the rigid trailing edge 13. The trailing edge 13 rigidly carries upper and lower covering sections 28 and 29, which constantly overlap the free ends of the upper and lower coverings 15 and 16 in the direction of the profile depth. The upper and lower coverings 15 and 16 can execute a sliding movement in the direction of the profile depth with respect to the coordinated covering section 28 and 29 of the trailing edge 13. Provided therefor is a guide by means of which the coverings 15 and 16 are held in sliding contact at the covering sections 28 and 29 (see FIG. 4). Inserted within the coverings 15 and 16 is a skeleton carrier 30 extending in the area of the plane — enclosing the skeleton line of the profile of the deflector blades — from the nose portion 12 to the trailing edge 13. This skeleton carrier 30 is undulated in the direction of the profile depth, whereby the elevations 33 and 34 extend in the direction toward the upper and lower coverings 15 and 16. The skeleton carrier 30 is bending-elastic and rigidly mounted in the slots 37 and 38 in the nose portion 12 and the trailing edge 13, respectively.

Secured onto the inside of the upper and lower coverings 15 and 16, corresponding to the number of elevations 33 and 34 of the skeleton carrier 30, are the rigid supporting elements 39 and 40 which are constructed in a camlike fashion and which, with the sliding surfaces 32 and 32' thereof, are held in constant contact against the counter sliding surfaces of the skeleton carrier 30.

According to FIGS. 4 and 5, there are mounted at the guide spar 17 on both sides of the jet-deflecting blades 11, the guide elements 41 which engage in a corresponding curve guiding groove 45 in the lateral walls 6 and 7 of the jet-guiding pipe 5. Furthermore, on both sides of the guide spar 17, acts a displacing member 48 which is actuatable by a drive means and corresponding force-transmitting members, not further shown herein. The displacing member 48 is rotatably mounted on an axle 17' which, in turn, is rotatably mounted in a bore of the guide spar 17. Machined in the upper and lower coverings 15 and 16 are apertures 46 extending in the transverse direction of the profile. Through these apertures 46 extend the slide discs 42 which latter make contact with the inside of the upper and lower coverings 15 and 16. The slide discs 42 are secured to the covering sections 28 and 29 and hold these sections in constant sliding contact against the coverings 15 and 16.

FIG. 6 shows a further embodiment of the inner construction of the jet-deflecting blades 11, which embodiment differs from that shown in FIGS. 2 and 3. Positioned therein at each of the curve segments 39 and 40 serving as supporting elements, is a guide roller 54 and 54' and a carrier part 53 and 53', respectively. The carrier parts 53 and 53' are supported by the springs 52 and 52' respectively against the curve segments 39 and 40 so that they are maintained in constant contact against the skeleton carrier 30.

As is evident from FIG. 7, there are inserted within a bore in the nose portion 12 two mutually coaxial torsion rods 60 and 60', one end 63 and 63' of each of which is rigidly connected with the nose portion 12, and the other end 64 and 64' of each of which is held at the aircraft in a stationary manner in bores in the lateral walls 6 and 7 (FIG. 1a).

The operation of the construction described hereinabove is as follows: In a position of the blade grid 10 according to FIGS. 1 and 2, there occurs a free discharge of the propellent gas jet for producing horizontal thrust rearwardly. The jet-deflecting blades 11 have in this position a symmetrical, streamlined profile.

The supporting elements 39 and 40 are, with the sliding surfaces 32 and 32' thereof, in constant contact at the counter sliding surfaces of the elevations 33 and 34 of the bending-elastic skeleton carrier 30.

If it is intended to bring about a deflection of the propellent gas jet from its rearward exhaust direction, the jet-deflecting blades 11 are displaced by way of a drive (not shown) and the displacing members 48 as well as the pivoting pin 17' on both sides of the jet-deflecting blades 11 at the guide spar 17, in the sense of a profile curvature. For this purpose, the guide spar 17 is moved by means of the guide element 41 in the curve-guiding grooves 45, and therewith a curvature of the jet-deflecting blades 11 is set, and specifically presupposing that the nose portion 12 is rigidly clamped in at the airplane 1, or is displaceable against the action of a spring means. In this case the torsion rods 60 and 60' constitute the connection between the aircraft and each jet-deflecting blade. Due to the spring characteristic of the torsion rods, also the nose portion of the jet-deflecting blades 11 will execute a movement in the displacing direction, which movement takes place, however, with progressive delay with respect to the displacing movement of the trailing edge 13.

During the displacing movement of the jet-deflecting blades 11 in the sense of a curvature change, there will be produced - assuming that the upper and lower coverings 15 and 16 and the skeleton carrier are rigidly connected with the nose portion 12; that the coverings 15 and 16 are adapted to freely move in the direction of the profile depth except at their clamping-in place; and that the nose portion 12 is maintained stationary — a relative movement between the coverings 15 and 16 with respect to the skeleton carrier 30. Due to this relative movement, the position of the supporting elements 39 and 40 will be changed with respect to the elevations 33 and 34 of the skeleton carrier 30, and specifically with the progressive curvature of the jet-deflecting blades 11 in the sense of a change of the profile thickness in the individual cross-sections of the jet-deflecting blades 11. The slide rings 42 assure in this case a constant contact between the covering sections 28 and 29 of the trailing edge 13 and the coverings 15 and 16.

In the embodiment according to FIGS. 8 and 9, lever-like supporting elements 70 and 71 are provided instead of the curve segments according to FIGS. 2 and 3 and serve therein as supporting elements. One end of each of the supporting elements 70 is mounted in an articulated manner on a bearing 73 at the upper covering 15 and engages with its other end at a bearing 74 at the bending-elastic skeleton carrier 75. In the same manner, the supporting elements 71 are secured with one end thereof in an articulated fashion at a bearing 77 at the lower covering 16, and with the other end thereof in an articulated fashion at a bearing 76 at the bearing element 75.

The operation of the embodiment according to FIGS. 8 and 9 is as follows:

During a displacement of the jet-deflecting blades 11 and of the skeleton carrier 75 in the sense of a curvature change or variation, there arises of necessity a relative movement in the direction of the profile depth between the coverings 15 and 16 and the skeleton carrier 75. This relative movement brings about a displacement of the supporting elements 70 and 71 about the bearings 73, 74 and 76, 77, and specifically so that the supporting elements 70 and 71 — depending upon their starting position and their length - undergo a change or variation of their inclination against the skeleton carrier 75 in the direction of the profile depth of the flow element or body 11. As a result, the individual sections of the covering 15 and 16 are displaced in the sense of an increase or decrease of the profile thickness in the direction toward the skeleton carrier.

As has already been indicated, the subject matter of the present invention is not limited only to deflecting blades according to the embodiments described herein, but rather may be employed with the same advantageous effect also, for example, in wings for producing aerodynamic lift. It further is also conceivable to mount the skeleton carrier 30 or 75 displaceably, by means of a displacing mechanism, in the transverse direction of the profile so that a change or variation of the profiling or of the profile thickness is attainable also without a forcible coupling with the curvature change or variation of the flow element or body.

It will be obvious to those skilled in the art that many modifications may be made within the scope of the present invention without departing from the spirit thereof, and the invention includes all such modifications.

What is claimed is:

1. An aerodynamic body adapted to affect the direction of flow of a flowing media, comprising;
   a longitudinally-disposed, fixed-profile nose portion;
   a longitudinally-disposed trailing edge portion spaced from said nose portion;
   a flexible upper and a flexible lower skin portion forming the profile contour of said body, fixedly attached to one of said nose portion and said trailing edge portion and slidably coupled to the other of said nose portion and said trailing edge portion;
   a flexible skeleton support fixedly coupled to said nose portion and said trailing edge portion and spanning said body adjacent the center thereof;
   a plurality of longitudinally-disposed bracing elements fixedly coupled to each of said upper and said lower skin portions, transversely spaced from one another and of generally V-shaped cross-section, with their apexes in sliding contact with said skeleton support; and
   adjusting means operatively coupled to said body and adapted to flex one of the trailing portion and the leading portion of said body with respect to the other.

2. A body in accordance with claim 1 wherein one of the skeleton support and the bracing elements is of a configuration with respect to the other that the upper and lower skin portions move toward or away from said skeleton support as said body is flexed and said bracing elements slide along said skeleton support.

3. A body in accordance with claim 2 wherein the bracing elements differ in height from one another, whereby the skin portions move toward or away from the skeleton support as said body is flexed and said bracing elements slide along said skeleton support.

4. A body in accordance with claim 2 wherein the skeleton support is undulated transversely, whereby the skin portions move toward or away from said skeleton support as said body is flexed and the bracing elements slide along said skeleton support.

5. A body in accordance with claim 2 wherein the bracing elements differ in height from one another and the skeleton support is undulated transversely, whereby the skin portions move toward or away from said skeleton support as said body is flexed and said bracing elements slide along said skeleton support.

6. A body in accordance with claim 1 wherein the bracing elements of the upper and the lower skin portions, respectively, are oppositely-directed and co-acting curve segments.

7. A body in accordance with claim 1 which includes spar means longitudinally-disposed between the upper and lower skin portions adjacent the trailing portion of said body and the adjusting means is connected to said spar means.

8. A body in accordance with claim 7 wherein the spar means has curved surfaces for contact with the upper and the lower skin portions, respectively, and said spar means is rotatably mounted on a longitudinally-disposed axle.

9. A body in accordance with claim 1 wherein the bracing means includes biasing means urging the skeleton support against said bracing means.

10. A body in accordance with claim 1 wherein the nose portion includes longitudinally-disposed torsion bar means for mounting said nose portion.

11. A body in accordance with claim 1 wherein the trailing edge portion includes a second upper skin portion and a second lower skin portion overlapping the first-mentioned upper and the first-mentioned lower skin portion, respectively.

12. A body in accordance with claim 11 which includes slide disc means operatively coupled to the first and second upper skin portions and the first and second lower skin portions to guide said first and second upper skin portions and said first and second lower skin portions, respectively, in sliding relation to one another.

* * * * *